(12) United States Patent
Kim et al.

(10) Patent No.: US 10,626,229 B2
(45) Date of Patent: Apr. 21, 2020

(54) SILANE-CROSSLINKABLE ETHYLENE-PROPYLENE COPOLYMER AND CROSSLINKED BODY OF THE SAME

(71) Applicants: FURUKAWA ELECTRIC CO., LTD., Tokyo (JP); FURUKAWA ELECTRIC POWER SYSTEMS CO., LTD., Yokohama-shi (JP)

(72) Inventors: Jae Kyung Kim, Tokyo (JP); Eiji Kozawa, Tokyo (JP); Masami Tazuke, Tokyo (JP); Yasuo Nakajima, Tokyo (JP); Yutaka Suzuki, Tokyo (JP); Hironobu Hirano, Tokyo (JP)

(73) Assignees: FURUKAWA ELECTRIC CO., LTD., Tokyo (JP); FURUKAWA ELECTRIC POWER SYSTEMS CO., LTD., Yokohama-shi (JP)

( * ) Notice: Subject to any disclaimer, the term of this patent is extended or adjusted under 35 U.S.C. 154(b) by 293 days.

(21) Appl. No.: 14/868,002

(22) PCT Filed: Mar. 6, 2014

(86) PCT No.: PCT/JP2014/055724
§ 371 (c)(1),
(2) Date: Sep. 28, 2015

(87) PCT Pub. No.: WO2014/156529
PCT Pub. Date: Oct. 2, 2014

(65) Prior Publication Data
US 2016/0046770 A1 Feb. 18, 2016

(30) Foreign Application Priority Data
Mar. 29, 2013 (JP) ................. 2013-072292

(51) Int. Cl.
| | | |
|---|---|---|
| *C08L 51/04* | (2006.01) | |
| *C08J 3/24* | (2006.01) | |
| *C08K 3/26* | (2006.01) | |
| *C08F 255/04* | (2006.01) | |
| *C08L 51/06* | (2006.01) | |
| *C08L 23/14* | (2006.01) | |

(52) U.S. Cl.
CPC ............ *C08J 3/24* (2013.01); *C08F 255/04* (2013.01); *C08K 3/26* (2013.01); *C08L 23/142* (2013.01); *C08L 51/06* (2013.01); *C08J 2323/26* (2013.01); *C08K 2003/265* (2013.01); *C08L 2312/08* (2013.01)

(58) Field of Classification Search
None
See application file for complete search history.

(56) References Cited

U.S. PATENT DOCUMENTS

| | | | | |
|---|---|---|---|---|
| 3,646,155 A | * | 2/1972 | Scott ................. | B29C 47/0004 525/288 |
| 4,247,667 A | | 1/1981 | Nojiri et al. | |
| 2009/0143531 A1 | * | 6/2009 | Ouhadi ................. | C08F 8/00 525/69 |

FOREIGN PATENT DOCUMENTS

| | | |
|---|---|---|
| EP | 4034 A1 | 9/1979 |
| JP | 54-117549 | 9/1979 |
| JP | 55-129441 | 10/1980 |
| JP | 57-147507 | 9/1982 |
| JP | 58-206659 | 12/1983 |
| JP | 63-172712 | 7/1988 |
| JP | 06-136066 | 5/1994 |
| WO | WO-2010/009024 A2 | 1/2010 |

OTHER PUBLICATIONS https://www.united-initiators.com/wp-content/uploads/2016/07/UI_Brochure_CUROX.pdf; date unknown.*
International Search Report (with English translation), International Application No. PCT/JB2014/055724, dated May 27, 2014.
Varox Peroxide Brochure, Crosslinking Agents for the Rubber & Plastics Industries, available at <http://www.camsi-x.com/web/Por_Mercado/VAROX_Peroxides_Brochure.pdf>.
Chemicalland 21—Di-tert-BUTYL Peroxide available at <http://www.chemicalland21.com/specialtychem/perchem/DI-tert-BUTYL%20PEROXIDE.htm>.
International Preliminary Report on Patentability, corresponding International Application No. PCT/JP2014/055724, dated Sep. 29, 2015.
Written Opinion of the International Searching Authority (English Translation), for International Application No. PCT/JP2014/055724, dated May 27, 2014.

* cited by examiner

*Primary Examiner* — Tae H Yoon
(74) *Attorney, Agent, or Firm* — Marshall, Gerstein & Borun LLP

(57) ABSTRACT

A polyolefin-based thermoplastic elastomer and a crosslinked body of the same which can undergo a silane-crosslinking process excellent in productivity and have a rubber property required as a substitute material for EPDM is disclosed herein and can use a silane-crosslinkable ethylene-propylene copolymer characterized in that an organic peroxide (B) and a silane coupling agent (C) are compounded with an ethylene-propylene copolymer resin (A) which comprises 5 to 25% by mass of an ethylene component and 75 to 95% by mass of a propylene component, and whose MFR measured at 230° C. and with a load of 2.16 kg applied is 20.0 g/10 min or less. and further a compounded amount of the organic peroxide is 0.1 to 0.6 pts. mass based on 100 pts. mass of the ethylene-propylene copolymer resin (A) and a one-minute half-life temperature of the organic peroxide is 175.2° C. or less.

20 Claims, No Drawings

SILANE-CROSSLINKABLE ETHYLENE-PROPYLENE COPOLYMER AND CROSSLINKED BODY OF THE SAME

CROSS-REFERENCE TO RELATED APPLICATION

The present application is a continuation of International Application No. PCT/JP2014/055724 filed Mar. 6, 2014, which claims the priority benefit of Japanese Patent Application No. 2013-072292 filed Mar. 29, 2013, the disclosure of which are hereby incorporated by reference in their entireties.

FIELD OF THE DISCLOSURE

The present disclosure relates to a silane-crosslinkable ethylene-propylene copolymer and a crosslinked body of the same which are a resin material excellent in formability, workability, machinability, an insulating property, and particularly a rubber property and are usable as a substituting material for a rubber material including EDPM.

BACKGROUND

In the field of parts for connecting electric cables or the like, EPDM (crosslinked rubber of ethylene-propylene-diene ternary copolymer) is frequently used. This is attributable to a recovery property after tension applied thereto, a rubber property such as flexibility, an insulating property, an electric property such as a tracking resistance property, a heat resistance property, a long-term property such as heat aging resistance, and such a superior property as a high degree of freedom for a composition for the sake of corresponding flexibly to levels demanded for the above properties. These EDPMs are produced by a crosslinking process through processes using peroxides and sulfuric compounds together (this process is generally called as "vulcanizing process" in rubber). This vulcanizing process requires a long time in manufacturing to lower its productivity, causing its manufacturing cost to be substantially pushed up.

In order to solve these problems, a study for manufacturing products of EDPM by a mold injection process is on-going and the manufacturing is put to practical use. Nevertheless, the vulcanizing process inside a metallic mold is still needed. There is further a problem that when manufacturing a multi-layered molded object, an interlayer adhesive property is poor. Hence, the improvement in productivity is limited since a surface treatment should be carried out for every layer to need to improve the adhesive property and so on. Further, there is a problem that a composition study for improving fluidity such as adding a developing oil in the composition must be newly performed. In the field of the parts for connecting the electric cables, e.g., there is a case where properties (an electric property) required for the products are impaired, and a phenomenon such as the oil transferring to other layers occur, thus causing a new problem in reliabilities of processing and products.

As a resolution method for these problems, it is considered that a thermoplastic elastomer, e.g., is used. As substitute for EPDM, a polyolefin-based thermoplastic elastomer is most suitable and the elastomer, which does not need the vulcanizing process differently from EDPM and has such a grade of commercial products as is usable for any one of extrusion, injection, and molding methods, is available in the market. A polyolefin-based thermoplastic elastomer material is classified roughly into two types from its makeup of components. One type includes a crosslinked body of rubber acting as a dispersion phase in a thermoplastic resin serving as a matrix. The other type is an olefin-based copolymer whose crystallinity is intendedly lessened. In both the elastomer materials, however, their physical properties widely vary near their melting points and besides a plastic property remains at a normal operating temperature range. Therefore, since there are some cases where their recovery actions are poor after deformation, a necking phenomenon occurs after large deformation and so on, both the elastomer materials cannot exert a property suitable to that of rubber, so that there exists no elastomer material with a satisfactory property as substitute for rubber.

In order to make up for such a lack of the rubber property, the crosslinking process is on-going for the elastomer. There are generally three crosslinking methods including a peroxide crosslinking one, a silane crosslinking one, and a radiation crosslinking one (see a patent document 1). However, the crosslinking method using peroxide is the same method as that for manufacturing EDPM and the manufacturing flow involves the crosslinking process, and therefore the purpose for improving the productivity cannot be achieved. Further, although the crosslinking method using radiation is advantageous from the viewpoint of capable of readily obtaining a crosslinked body, a radiation irradiating system is extremely high in price to considerably push up the manufacturing cost of the crosslinked body, thus becoming unsuitable to practical use.

It is known that in the silane crosslinking method, a process for carrying out a silane modification of the thermoplastic elastomer while maintaining a suitable rubber property is extremely difficult. This is because a polyolefin-based thermoplastic elastomer excellent in rubber property is easy to be subjected to radical decomposition and hence the resin in which a crosslinkability and the rubber property are compatible is hard to obtain. The reason for this is that the olefin-based thermoplastic elastomer commonly known is not composed of a single component, but there are many elastomers blended with heterogeneous components. As cited above, as a representative one, there is an elastomer material using a resin (polypropylene) easy to decompose as a matrix and containing, in a dispersion phase, a crosslinkable resin such as crosslinked EPDM. At the time of manufacturing, such an elastomer is allowed to undergo a crosslinking reaction and a decomposing reaction to develop the rubber property in a delicately-balanced state. Accordingly, when such an elastomer further undergoes the silane modification process, a physical-property balance is broken down and hence a crosslinked body meeting a condition of being ought to be a substitute for EDPM cannot be obtained.

Then, when using, as a thermoplastic elastomer, an ethylene-propylene copolymer whose propylene component is increased for the purpose of lowering a degree of crystallinity, if achieving an ideal crosslinking condition, the ethylene-propylene copolymer is optimal as a substitute. There are, however, plenty of decomposable propylene components therein and hence this copolymer is considerably decomposed in a process for applying a graft reaction to a silane coupling agent to become thereby unable to maintain the rubber property. For this reason, a physical property substitutable for EPDM is extremely difficult to develop. Accordingly, when trying to manufacture a superior silane crosslinked body using such a common thermoplastic elastomer, the resin itself needs to review, resulting in a high material cost. This is why there exists no low-price commercialized products under the present circumstances.

Also, International Patent Application Publication No. WO 2010/009024 discloses such an ethylene-propylene copolymer, excellent in a heat shielding performance, subjected to the radiation crosslinking process. However, a silane-crosslinked ethylene-propylene copolymer which develops a superior rubber property and is subjected to a silane crosslinking process is not disclosed therein.

SUMMARY

The present disclosure is made to solve the problems like these. Therefore, it is an object of the present disclosure to provide a polyolefin-based thermoplastic elastomer and a crosslinked body of the same which can undergo the silane crosslinking process excellent in productivity and have a rubber property required as substitute for EDPM.

In order to achieve the above object, there is provided the following embodiments.

(1) A crosslinked body, wherein the crosslinked body is obtained by crosslinking the silane-crosslinkable ethylene-propylene graft copolymer, wherein an organic peroxide (B) and a silane coupling agent selected from vinyl trimethoxysilane and/or vinyl triethoxysilane (C) are compounded with an ethylene-propylene random copolymer resin (A) which comprises substantially an ethylene component and a propylene component has an isotactic structure, the ethylene component and the propylene component being 5 to 25% by mass and 75 to 95% by mass, respectively, and whose melt mass flow rate measured at 230° C. and with a load of 2.16 kg applied is 20.0 g/10 min or less, and further a compounded amount of the organic peroxide (B) is 0.1 to 0.6 pts. mass based on 100 pts. mass of the ethylene-propylene copolymer resin (A) and a one-minute half-life temperature of the organic peroxide (B) is between 130° C. and 175.2° C., wherein a heat deformation ratio is 35% or less which indicates a reduction rate X % determined by a formula $X=(t_0-t_1)/t_0*100$, where $t_0$ denotes thickness of a test piece before heating and $t_1$ denotes thickness thereof after heating, the thickness $t_1$ being determined in such a manner that the test piece is made into a rectangular shape that is 2 mm thick, 15 mm wide, and 30 mm long, and after heating the test piece at 100° C. for 30 min., a load of 2.0 kg/f is applied to the test piece, followed by further heating the test piece at the same temperature for 30 min. and thereafter the thickness $t_1$ is measured, so that the thickness $t_1$ is obtained.

(2) A crosslinked body, wherein the crosslinked body is obtained by crosslinking the silane-crosslinkable ethylene-propylene graft copolymer, wherein an organic peroxide (B) and a silane coupling agent selected from vinyl trimethoxysilane and/or vinyl triethoxysilane (C) are compounded with an ethylene-propylene random copolymer resin (A) which comprises substantially an ethylene component and a propylene component has an isotactic structure, the ethylene component and the propylene component being 5 to 25% by mass and 75 to 95% by mass, respectively, and whose melt mass flow rate measured at 230° C. and with a load of 2.16 kg applied is 20.0 g/10 min or less, and further a compounded amount of the organic peroxide (B) is 0.1 to 0.6 pts. mass based on 100 pts. mass of the ethylene-propylene copolymer resin (A) and a one-minute half-life temperature of the organic peroxide(B) is between 130° C. and 175.2° C., wherein a residual strain ratio is 60% or less which is determined by a formula $(l_1-l_0)/l_0*100$, where $l_1$ denotes a length of a test piece after applying tension thereto and $l_0$ denotes a length thereof before applying tension thereto, the length $l_1$ being determined in such a manner that the test piece is made into a rectangular shape that is 2 mm thick, 10 mm wide, and 50 mm long except for a length of grippers, and after putting the test piece into a test machine heated at 90° C. to heat the test piece for 5 minutes therein, the test piece is extended at a tension rate of 50 mm/min. till its strain ratio reaches 250% and immediately after that, the test piece thus extended is turned back to normal at the rate of 50 mm/min. and at the moment a stress caused by the extending action becomes zero, a distance of the test piece between grippers is measured, so that the length $l_1$ is obtained from the distance.

(3) The crosslinked body according to (1) or (2), wherein a compounded amount of the silane coupling agent (C) is 1 to 5 pts. mass based on 100 pts. mass of the ethylene-propylene copolymer resin (A).

(4) The crosslinked body, wherein the crosslinked body is obtained by crosslinking the composition wherein the silane-crosslinkable ethylene-propylene graft copolymer according to (1) or (2) contains an insulating inorganic filler.

(5) The crosslinked body, wherein the crosslinked body is obtained by crosslinking the composition according to (4) further contains a softener.

(6) The crosslinked body according to (4), wherein a compounded amount of the insulating inorganic filler is 10 to 150 pts. mass based on 100 pts. mass of the silane-crosslinkable ethylene-propylene graft copolymer.

(7) The crosslinked body according to (4), wherein a compounded amount of the softener is 5 to 50 pts. mass based on 100 pts. mass of the insulating inorganic filler.

There can be provided the polyolefin-based thermoplastic elastomer and the crosslinked body of the same which can undergo a silane crosslinking process excellent in productivity and have the rubber property required as a substitute for EDPM.

DETAILED DESCRIPTION

Hereunder is a detailed description on embodiments of the present disclosure.

Base Resin

As a base resin of the silane crosslinked body according to the present disclosure, an ethylene-propylene random copolymer is used which is uniformed in active site and is polymerized using a single site catalyst represented by a catalyst generally called a metallocene-based catalyst. In these copolymers, a structure of a propylene component mainly involves an isotactic structure.

In the general isostatic polymerization method, the polymerization is carried out in the presence of a catalyst containing a bis(cyclopentadienyl) metallic compound and (1) a non-coordinating compatible anion activator or (2) an alumoxane activator. Here, the bis(cyclopentadienyl) metallic compound means a compound which contains group IV transition metals (titanium, zirconium, hafnium) as a central metal and as a ligand, two cyclopentadienyls crosslinked by a substituted or non-substituted carbon atom or a substituted or non-substituted silicon atom and in which the group IV transition metal compound is chiral. Further, a crosslinking atom is substituted by at least one methyl group and a cyclopentadienyl ligand is desirably indenyl. The non-coordinating compatible anion activator (1) is a precursor ionic compound (a boron-based anion promotor) containing group XIII anion substituted by tetraaryl halide in which an aryl substituent has at least two cyclic aromatic rings. Further, the alumoxane activator (2) is desirably methyl alumoxane that is a reactant of trimethylaluminum and water. The chemical formula is expressed by the following one.

$$CH_3—(Al(CH_3)—O)n—Al(CH_3)—$$
$$CH_3(n=4\sim20)$$

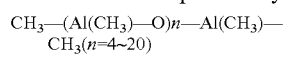

Chemical Formula 1

The ethylene-propylene random copolymer usable appropriately in the present disclosure is manufactured by copolymerizing propylene and ethylene at reaction temperature of 60° C. or more in a solution method, using a catalyst complex containing the bis(cyclopentadienyl) metallic compound and the non-coordinating compatibility anion activator (1) or the alumoxane activator (2). At this time, the propylene becomes a stereospecific polypropylene by the catalyst complex. This resin containing a propylene component as a principal component and substantially containing no other monomer component than the propylene component and the ethylene component exhibits an excellent physical property balance since this resin has the homogeneity of polymer chains and an advanced stereoregularity.

Further, due to the property of its manufacturing method, the ethylene-propylene copolymer thus obtained becomes one substantially containing no nonhomogeneity in its intermolecular composition distribution. Specifically, this copolymer becomes one whose intermolecular composition distribution is extremely high in random property, thus becoming a resin with a superior rubber property as described in detail later. This tendency becomes more prominent by allowing this resin to undergo a silane crosslinking process.

As the base resin optimally usable for the silane-crosslinked body according to the present disclosure, the random copolymer as described above is most desirable to be easy to obtain a target rubber property. There is, however, no need for limiting this base resin, and it may be allowable to use a resin partially having a block structure of the ethylene component or the propylene component to allow an intermolecular heterogeneous property to exist.

Further, in the resin used for the present disclosure, a content of the propylene component is desirably in the range of 75 to 95% by mass. If the content is less than 75% by mass, a crystallinity of the resin becomes poor and even if the resin is solidified by a cooling operation, it is difficult to make the resin into a stable shape. Therefore, the resin cannot be taken off in a strand-like shape after extrusion to become unable to perform a cutting process (a pelletization process) into a pellet shape, thereby presenting inconvenience to the next molding process. Further, for the same reason, a master batch into which an additive agent is kneaded in advance cannot be manufactured. If the silane crosslinked body is manufactured using such a material, the material needs to be made into a product shape by a molding machine equipped with special equipment. Specifically, after once manufacturing a silane-crosslinkable resin by an extruder, the resin is taken off in a sheet-like shape and then after the resin thus shaped is put into a banbury mixer or he like to be mixed with necessary additive agent, the mixture is allowed to undergo local processes to be made again into a sheet-like shape, further making it necessary to transfer the sheet-like matter to a molding machine. As a result, the productivity is remarkably lowered as compared with a case where its pelletization is possible. On the other hand, when the propylene component exceeds 95% by mass, the crystallinity of the propylene component is too high, a lack in elastomeric property results. Accordingly, even if allowing the resin to undergo a crosslinking process, a rubber-like property cannot be obtained and therefore the object of the present disclosure cannot be attained. For the above reason, the content of the propylene component is desirably in the range of 75 to 95% by mass and is more desirably in the range of 75 to 85% by mass.

The fact that the resin is substantially composed of the ethylene propylene component and the propylene component means that the ethylene-propylene copolymer resin (A) is composed of the ethylene propylene component, the propylene component, and inevitable impurities. Desirably, the impurities contained in the ethylene-propylene copolymer resin (A) are 1% by mass or less and the total of the ethylene propylene component and propylene component is 99% by mass or more.

Organic Peroxide

As a radical generator, since the decomposition of the base resin becomes problematic in the present base, the radical generator whose one-minute half-life temperature is 176° C. or less is used. A radical generator whose one-minute half-life temperature is 130° C. to 176° C. is desirable, and a radical generator whose one-minute half-life temperature is 130 to 175.2° C. is more desirable, and a radical generator whose one-minute half-life temperature is 150 to 166° C. is furthermore desirable. If using a radical generator whose one-minute half-life temperature exceeds this range is used, the radical generator does not sufficiently advance in decomposition and thereby a graft reaction stops advancing. When increasing an extrusion temperature in order to ought to improve this problem, the decomposition of the base resin drastically progresses to become unable to obtain a crosslinked body for attaining a target degree of crosslinking. Further, if using the radical generator with the one-minute half-life temperature less than this range, the decomposition has advanced at a comparatively early stage of the extrusion to complete the reaction under an insufficient kneading condition. Thus, since the graft becomes insufficient, the graft concentration becomes non-uniform inside the system and so on, a crosslinked body that varies widely is finally manufactured.

As the radical generators suitable to such conditions, for example the following organic peroxides are cited: dibenzoyl peroxide; peroxy-di(3-methylbenzoyl); peroxy-benzoyl (3-methylbenzoyl); disuccinic acid peroxide; peroxy-2-ethylhexane acid-t-hexyl; peroxy-2-ethylhexanoic acid-t-butyl; peroxy-2 methylcyclohexanoic acid 1,1-di(t-butyl); peroxy-3,3,5-trimethylcyclohexanoic acid-1,1-di(t-hexyl); peroxy-cyclohexanoic acid 1,1-di(t-hexyl); peroxy-cyclohexanoic acid 1,1-(t-butyl); 2,2-di(peroxy-cyclohexanoic acid 4,4-di (t-butyl)) propane; peroxy-isopropylmonocarboxylic acid t-hexyl; 2,5-dimethyl-2,5-di(benzoylperoxy)hexane; peroxy-isopropylmonocarboxylic acid t-butyl; peroxy-lauric acid t-butyl; peracetic acid-t-butyl; peroxy-benzene acid t-hexyl; peroxy-2-ethylhexylmonocarboxylic acid t-butyl; peroxy-3,5,5-trimethylhexanoic acid t-butyl; peroxy-benzene acid t-butyl; monopermaleic acid t-butyl; 4,4-bis[(t-butyl) peroxy]pentanoic acid butyl; peroxy-cumene acid t-butyl; dicumyl peroxide; and di(2-t-butylperoxyisopropyl) benzene.

A compounded amount of the radical generator depends on a type of radical generator and an existing amount of an additive agent with a radical trapping function. The compounded amount is, however, desirably 0.1 to 0.6 pts. mass based on 100 pts. mass of the resin. If the compounded amount is less than this compounded amount, an absolute amount of the radical generated in a system is too small to advance adequately a reaction and hence a sufficient rubber property is unable to be obtained after the crosslinking process. Contrarily, if the compounded amount is more than this amount, an amount of the radical generated in the system is too large, and hence the decomposition of the base resin advances too much, and thereby even if a sufficient crosslinking degree is attained by the crosslinking process, the base resin is severely deteriorated to make it impossible to obtain an excellent mechanical property.

The one-minute half-life temperature described above is measured by the following method. By using a solvent, such as benzene, low in activation level to a radical, a solution of an organic peroxide of 0.1 mol/L is prepared. The solution is encapsulated into a glass tube subjected to nitrogen substitution to be immersed in a constant-temperature reservoir set at a given temperature and then the solution is thermally decomposed. The decomposing action of the organic peroxide in a dilute solution can be approximately treated as a first order reaction. Therefore, when defining a decomposed peroxide amount as x, a decomposition rate constant as k, time as t, and an initial concentration of the organic peroxide as a, the following mathematical formulae 1, 2 are established.

$$\frac{dx}{dt} = k(a-x) \quad \text{Mathematical Formula 1}$$

$$\ln\left(\frac{a}{a-x}\right) = kt \quad \text{Mathematical Formula 2}$$

A half-life period is a time required for the initial concentration of the organic peroxide to halve by decomposition, and hence when t is defined as a half-life period $t_{1/2}$ and a/2 is substituted into x, a mathematical formula (3) is expressed as follows:

$$\ln 2 = kt_{1/2} \quad \text{Mathematical Formula 3}$$

Accordingly, the organic peroxide is thermally decomposed at some temperature and a relationship between the time t and ln(a/(a−x)) is plotted and then when k is determined from a gradient k of a straight line obtained, the half-life period ($t_{1/2}$) can be determined at that temperature by the Mathematical Formula 3.

Silane Coupling Agent

A silane coupling agent used for the silane crosslinking method is reacted with the above ethylene-propylene random copolymer in the presence of the radical generator. The silane coupling agent is expressed by a general formula RR'SiY2 (in the formula, e.g., R denotes an unsaturated carbon hydride group such as a vinyl group and an aryl group, or hydrocarbonoxy group; Y denotes a hydrolyzable organic group such an alkoxyl group or the like represented by a methoxy group, an ethoxy group, and a butoxy group; and R' is a substituent group the same as R or Y). In the general formula, the R part is coupled with the ethylene-propylene copolymer by the graft reaction, while silanol generated from the Y part in the formula performs dehydration condensation reaction with the silanol of the silane coupling agent, coupled to other ethylene-propylene copolymer, to be crosslinked by siloxane coupling.

More specifically, as the silane coupling agent, the following materials are cited: vinyl trimethoxysilane, vinyl triethoxysilane, vinyl dimethoxymethylslane, vinyl diethoxymethylsilane, vinyl dimethylethoxysilane, vinyl dimethyethylsilane, vinyl diethoxyethylsilane, vinyl dimethylmethoxysilane, vinyl diethylmethoxysilane, vinyl diethylmethoxysilane, vinyl diethylethoxysilane, vinyl tris(2-methoxyethxy)silane, vinyl triacetoxysilane, vinyl methyldiacetoxysilane, vinyl dimethylacetoxysilane, vinyl ethyldiacetoxysilane, vinyl diethylacetoxysilane, divinyl dimethoxysilane, divinyl diethoxysilane, divinyl methoxyethoxysilane, divinyl diacetoxysilane, or the like.

The compounded amount of the silane coupling agent is desirably in the range of 0.2 to 10 pts. mass, and is more desirably in the range of 0.5 to 7 pts. mass, and is especially desirably in the range of 1 to 5 pts. mass, based on 100 pts. mass of the base resin. If the compounded amount of the silane coupling agent is less than 0.2 pts. mass, crosslinking points primarily decrease excessively and then the crosslinked body with a sufficient degree of crosslinking cannot be obtained. Contrarily, if the compounded amount of the silane coupling agent is more than 10 pts. mass, since the concentration of the silane coupling agent heightens excessively in the system, independent polymerizing reactions and dehydration condensation reactions increase excessively to make it impossible to obtain a uniform crosslinked body, thus resulting in an adverse effect on a physical property of the crosslinked body.

Silanol Condensation Catalyst

This catalyst is not particularly limited as long as the catalyst is usable for the silane crosslinking. The following materials are cited: for example, dibutyltin dilaurate, dibutyltin diacetate, dibutyltin dioctate, dioctyltin dilaurate, tin (II)octet, tin naphthenate, zinc caprylate, tetrabutylesther titanate, tetranonylester titanate, bis(acetylacetonitrile)diisobuyl titanate or the like. The compounded amount of silanol condensation catalyst is 0.0005 to 1.0 pts. mass and is desirably 0.01 to 0.5 pts. mass, based on 100 pts. mass of the base resin. If the compounded amount of silanol condensation catalyst is less than 0.0005 pts. mass, a sufficient crosslinking catalyst function cannot be obtained to laten excessively a crosslinking rate and then a degree of crosslinking is not fully increased, thereby making a crosslinked body inferior in rubber property. Contrarily, if the compounded amount of silanol condensation catalyst is more than 1.0 pts. mass, a crosslinking function becomes sufficient. This exerts, however, harmful influences on the mechanical property, the insulating property if necessary, and other properties, thereby resulting in an undesirable situation.

Insulating Inorganic Filler

By adding an insulating inorganic filler to the silane-crosslinkable ethylene-propylene copolymer, the composition can be obtained where the insulating property is imparted to the silane-crosslinkable ethylene-propylene copolymer. The insulating inorganic filler is not especially limited, and the following materials are cited: calcium carbonate, magnesium hydroxide, aluminum hydroxide, mica, silica powder, talc, clay, alumina or the like. These materials may be subjected to surface treatment as needed. Thus, the above filler can be compounded according to properties such as an electric property, a mechanical property, and a flame resistance property required for the products. Further, the particle diameter of the calcium carbonate is not particularly limited. An average particle diameter is, however, desirably in the range of 10 nm to 10 μm, and is more desirably 100 nm or less.

The compounded amount of this insulating inorganic filler is desirably in the range of 10 to 150 pts. mass, and is more desirably in the range of 50 to 100 pts. mass, based on 100 pts. mass of the base resin. If the compounded amount of the insulating inorganic filler is less than 10 pts. mass, a sufficient insulating property cannot be obtained. Contrarily, if the compounded amount is more than 150 pts. mass, a sufficient insulating property is possible. The base resin, however, becomes high in hardness, and hence such harmful influence is exerted on the rubber property such as a compression set, thereby resulting in an undesirable situation.

Softener

Further, a softener may be added to the composition containing the silane-crosslinkable ethylene-propylene copolymer and the insulating inorganic filler. The softener used for the compositions according to the present disclosure is not especially limited. However, a process oil and an aliphatic cyclic saturated hydrocarbon resin are desirable and the process oil is more desirable. The process oil is not especially limited as long as it is generally used as a rubber compounding agent. Then, among paraffinic, naphthenic, and aromatic oils, one type may be independently used or, two or more types of the oils are combined to be usable. In addition, the aliphatic cyclic saturated hydrocarbon resin is a cyclopentadiene resin or a dicyclopentadiene resin. Specifically, the aliphatic cyclic saturated hydrocarbon resin is a petroleum resin composed mainly of cyclopentadiene and dicyclopentadiene, and means a copolymer composed of the cyclopentadiene or the dicyclopentadiene and olefin-based hydrocarbon copolymerizable with the cyclopentadiene and the dicyclopentadien or means a polymer composed of cyclopentadiene and/or dicyclopentadiene. An additive amount of and a type of the softener are not especially limited. The compounded amount of the softener, however, is desirably 5 to 50 pts. mass and is more desirably 10 to 30 pts. mass, based on 100 pts. mass of the insulating inorganic filler. Further, if the compounded amount of the softener falls below 5 pts. mass, an effect of lowering the hardness of the composition becomes poor, and contrarily, if the compounded amount of the softener exceeds 50 pts. mass, a creeping action and the compression set of the product increase.

Other Components

The resin composition in the present disclosure, in addition to the above components, an antioxidant, a flame retardant, a weather-resistant agent, carbon black, a colorant, a filler, and additive agents such as other stabilizers or the like may be appropriately compounded. The antioxidant is not especially limited as long as it is generally usable as the antioxidant and an anti-aging agent which are typically usable for resin and rubber. As specific examples, the following materials are cited: 1,3,5-trimethyl-2,4,6-tris(3,5-t-butyl-4-hydroxybenzyl)benzene; pentaerythrityl-tetrakis[3 (3,5-di-t-butyl-4-hydroxyphenyl)propionate]; 2,2,4-trimethyl-1,2-dihydroquinoline polymer; 6-ethoxy-1,2-dihydro-2,2,4-trimethyl quinoline; N-phenyl-1-naphthylamine; octylateddiphenylamine: 4,4'-bis($\alpha,\alpha$-dimethylbenzyl) diphenylamine; dilauryl thiodipropionate; distearylthiodipropionate; dimyristyl thiodipropionate or the like. These materials are also usable in combination with one another as may be necessary. The additive amount of each of the above compounding agents can be appropriately determined as needed basis within a range of not impairing the object of the present disclosure.

Manufacturing Method

First Process

A silane compound, the organic peroxide, a reaction auxiliary, the antioxidant and a processing stabilizer if need arises, an inorganic filler, and the softener are appropriately compounded with the above ethylene-propylene random copolymer. An extruder in which a reaction is possible is employed and then the above compounded matter is allowed to undergo such processes as melting, kneading and reacting ones while being heated in the extruder to be extruded in a strand-like shape, followed by cooling, cutting or cutting by a rotating blade at an exit of a dice and again cooling the matter thus cut, thereby obtaining a pellet-like silane-crosslinkable ethylene-propylene random copolymer (a silane-modified composition).

Second Process

Further, in a second process, based on the copolymer preliminarily manufactured in a separate process, a master batch is made by compounding the silanol condensation catalyst, the antioxidant if needed, the inorganic filler, and the graphite powder. Then, the composition is allowed to undergo a melting process and a kneading process while the composition is being heated inside an injection molding machine and after injecting the composition into a metallic mold, the injected matter is rammed down, at a suitable mold temperature and by a mold compressing pressure, into a product shape and then is cooled, followed by taking out the cooled matter and thereafter a crosslinking reaction is advanced at 25° C. to 95° C. and at an atmospheric humidity under a humidified environment or inside warm water, thereby enabling a silane-crosslinked body to be obtained.

Melt Mass-Flow Rate (MFR)

MFR of the silane-modified composition obtained in the first process increases as compared with MFR of the ethylene-propylene random copolymer that is a base resin before the silane is modified. This is because the base resin contains principally the propylene component, and hence molecular chains are cut during the reaction to increase the fluidity of the silane-modified composition. When performing molding by injection molding as is done in the above example, although MFR of the resin after the silane is modified is not especially limited, MFR is desirably in the range of 5.0 to 100.0 g/10 min. in consideration of practical utility. From this viewpoint, there is a suitable MFR range also for the ethylene-propylene random copolymer allowed to act as the base resin and then it is desirable to use MFR of 20.0 g/10 min or less. If using the resin with a MFR larger than this value, MFR becomes too high due to a decomposing reaction at the time of modifying silane, and thereby since a dripping action occurs at the exit of the dice and the viscosity of the resin is enhanced, a pelletizing process become impossible to cause a defect in handling, making it impossible to supply the materials to the subsequent process. Additionally, in order to obtain the silane-crosslinkable resin excellent in fluidity, it is especially desirable that the MFR of the resin is 2.5 g/10 min. or more.

Average Molecular Weight

In order to minimize an adverse effect on the physical property caused by cutting the molecular chains due to decomposition, there is a suitable range also for an average molecular weight of the base resin. The standard polystyrene conversion weight-average molecular weight obtained by a measuring method shown below is desirably 15,000 to 5,000,000. More desirably, the weight-average molecular weight is in the range of 30,000 to 2,000,000. In the same fashion as MFR, if the weight-average molecular weight exceeds 5,000,000, a silane-crosslinkable resin excellent in fluidity cannot be obtained, and contrarily if the weight-average molecular weight falls below 15,000, such a problem is posed that a defect occurs in handling the resin, and therefore the materials cannot be supplied to the subsequent process.

Method for Measuring Molecular Weight

A high temperature GPC device (PL-220 made by Polymer Laboratories, Column: two PLgel MIXED-BLSs) with a differential refractive index detector was employed. As a solvent, orthodichlorobenzene was used. The solvent may contain a small amount of a stabilizer (such as BHT) if needed. Resin of 10 mg was put in in regard to the solvent of 5 mL and then the solution was agitated while applying heat till the resin was completely solved. The sample solution thus conditioned was injected into a testing machine with capacity of 0.200 mL. Then, a dissolution curve was measured at the flow rate of 1.0 mL/min. and at the column temperature of 145° C. As the standard sample, monodisperse polystyrene was used and the molecular weight calculated by the data processing was a polystyrene conversion value.

Effects According to the Present Embodiments

According to the present embodiments, there can be provided the crosslinked body with a recovery property after applying tension, the rubber property such as flexibility, an insulating property, an electrical property such as a tracking resistance property, a heat resistance property, a long-term property such as a heat aging resistance property, and a high degree of freedom for a composition for the sake of corresponding flexibly to the levels demanded for the above properties.

By obtaining the above crosslinked body using the silane crosslinking method, without requiring an independent vulcanizing process or a crosslinking process, the manufacturing time can be reduced and thereby the manufacturing cost can be considerably decreased with high productivity kept. Specifically, in the silane-crosslinking method according to the present embodiment, without the need to establish an independent crosslinking process, the silane crosslinking process proceeds during a molding process, thus permitting the rubber property to be obtained.

EXAMPLES

Next, in order to further clarify the effects of the present disclosure, examples and comparative examples are described in detail. The present disclosure, however, is not limited to these examples.

Example 1

Graft Modification Process

The ethylene-propylene copolymer, whose propylene component was 85% by mass, and MFR measured at 230° C. and with a load of 2.16 kg applied is 20 g/10 min and which was a random copolymer with an isostatic structure, was injected into a twin-screw extruder with a screw diameter of 15 mm and L/D=45. While injecting, from a liquid adding vent provided in an intermediary portion of a barrel, a mixed solution of vinyltrimethoxysilane (VTMS) and peroxy-cyclohexane acid 1,1-t-butyl (one-minute half-life temperature was 153.8° C.) at the rate of 2.0 pts. mass and 0.23 pts. mass, respectively per 100 pts. mass of the resin so that this rate was kept constant by a gear pump; the mixed solution was extruded into a strand-like shape with the temperature of a strand die set at 185° C. By allowing the strand-like matter to undergo a cooling process and a cutting process, a pellet-like silane-crosslinkable ethylene-propylene copolymer was obtained.

Catalyst Mixing, Sheeting, and Crosslinking Process 0.05 pts. mass of the dibutyltin dilaurate was mixed per 100 pts. mass of the pellet-like silane-crosslinkable ethylene-propylene copolymer thus obtained. This mixture was injected into a roll device whose surface temperature was set at 65° C. in advance. After kneading the mixture for 5 minutes, a gap between the rolls was adjusted to become approximately 2 mm according to the thickness of a sheet and the rolled strips were taken out. After cutting the strips in conformity to a mold which was 200 mm long, 160 mm wide and 2 mm thick, the strips were put in a press machine whose press plate was set at 130° C. in advance and then was pressed by 5 MPa pressure for five minutes to be cooled to 30° C. or less without any change, thus making a sheet which was 200 mm long, 160 mm wide and 2 mm thick. The sheet thus obtained was immersed in warm water of 80° C. for 24 hours, thus obtaining a crosslinked body according to the example 1.

Example 2

Except for changing the amounts of the vinyltrimethoxysilane and the peroxy-cyclohexane acid 1,1-t-butyl into those as listed in a Table 1, the crosslinked body was made by the same method as that in the example 1.

Examples 3 to 9

Except for changing a type of the base resin into one whose propylene component was 84% by mass and MFR was 2.5 g/10 min., and the amounts of the vinyltrimethoxysilane and the peroxy-cyclohexane acid 1,1-t-butyl into those as listed in the Table 1, the crosslinked bodies were made by the same method as that in the example 1.

Example 10

Except for changing the organic peroxide into dibenzoyl peroxide (one-minute half-life temperature was 130.0° C.) and a compounded amount of the dibenzoyl peroxide into that as listed in the Table 1, the crosslinked body was made by the same method as that in the example 1.

Example 11

Except for changing the silane coupling agent into the vinyltriethoxysilane (VTES) and the amount of the vinyltriethoxysilane into that as listed in the Table 1, the crosslinked body was made by the same method as that in the example 3.

Example 12

Except for changing a type of the base resin into one whose propylene component was 75 mass % and MFR was 5 g/10 min., and the amount of the peroxy-cyclohexane acid 1,1-t-butyl into that as listed in the Table 1, the crosslinked body was made by the same method as that in the example 1.

Example 13

Except for changing the organic peroxide into the dicumyl peroxide (one-minute half-life temperature was 175.2° C.), and the amounts of the vinyltrimethoxysilane and the organic peroxide into those as listed in the Table 1, the crosslinked body was made by the same method as that in the example 3.

Examples 14 to 17

Graft Modification Process

The ethylene-propylene copolymer, whose propylene component was 84% by mass and MFR measured at 230° C. and with a load of 2.16 kg applied was 2.5 g/10 min and which was a random copolymer with the isotactic structure, was injected into the twin-screw extruder with the screw diameter of 15 mm and L/D=45. The mixed solution of the vinyltrimethoxysilane (VTMS) and the peroxy-cyclohexane acid 1,1-t-butyl (one-minute half-life temperature was 153.8° C.) was injected at the rate of 2.0 pts. mass and 0.32 pts. mass, respectively, per 100 pts. mass of the resin, from the liquid adding vent provided in the intermediary portion of the barrel so that this rate was kept constant by a gear pump. Further, calcium carbonate of the compounded amount as listed in a Table 3 was injected into the extruder so that this compounded amount was kept constant by a coil feeder, and then the mixed matter was pushed out into a strand-like shape with a strand die set at 185° C. By allowing the strand-like matter to undergo a cooling process and a cutting process, pellet-like silane-crosslinkable ethylene-propylene copolymers were obtained.

Catalyst Mixing, Sheeting, and Crosslinking Process 0.05 pts. mass of the dibutyltin dilaurate was mixed per 100 pts. mass of the pellet-like silane-crosslinkable ethylene-propylene copolymer thus obtained. Further, carbon black, a compatibilizing agent, and an anti-aging agent were mixed in the compound amounts as listed in the Table 3. Then, this mixture was injected into a roll device whose surface temperature was set at 65° C. in advance. After kneading the mixture for 5 minutes, a gap between the rolls was adjusted to become approximately 2 mm according to the thickness of a sheet and the rolled strips were taken out. After cutting the strips in conformity to a mold which was 200 mm long, 160 mm wide and 2 mm thick, the strips were put in a press machine whose press plate was set at 130° C. in advance, and then was pressed by 5 MPa pressure for five minutes to be cooled to the temperature less than 30° C. without any change, thus making a sheet which was 200 mm long, 160 mm wide and 2 mm thick. The sheet thus obtained was immersed in warm water of 80° C. for 24 hours, thus obtaining the crosslinked bodies according to the examples 14 to 17.

Examples 18 to 25

Graft Modification Process

The ethylene-propylene copolymer, whose propylene component was 84 mass % and MFR measured at 230° C. and with a load of 2.16 kg applied was 2.5 g/10 min. and which was a random copolymer with an isostatic structure, was injected into the twin screw extruder with the screw diameter of 15 mm and L/D=45. From the first liquid adding vent provided in the intermediary portion of the barrel, the mixed solution of the vinyltrimethoxysilane (VTMS) and the peroxy-cyclohexane acid 1,1-t-butyl (one-minute half-life temperature was 153.8° C.) was injected at the rate of 2.0 pts. mass and 0.32 pts. mass, respectively per 100 pts. mass of the resin so that that this rate was kept constant by the gear pump. Further, calcium carbonate of the compounded amount as listed in a Table 3 was injected into the extruder so that this compounded amount of the calcium carbonate was kept constant by the coil feeder. Furthermore, a process oil of the compounded amount as listed in the Table 3 was injected from the second liquid adding vent provided in the intermediary portion of a barrel on a dice side nearer than the side feeder so that the rate of the process oil is kept constant by the gear pump. Then the compounded matter was extruded into a strand-like shape with a strand die set at 185° C. After allowing the strand-like matter to undergo a cooling process and a cutting process, a pellet-like silane-crosslinkable ethylene-propylene copolymers were obtained.

Catalyst Mixing, Sheeting, and Crosslinking Process 0.05 pts. mass of the dibutyltin dilaurate was mixed per 100 pts. mass of the pellet-like silane-crosslinkable ethylene-propylene copolymer thus obtained. Further, carbon black, the compatibilizing agent, and the anti-aging agent were mixed in the compound amounts as listed in the Table 3. This mixture was injected into a roll device whose surface temperature was set at 65° C. in advance. After kneading the mixture for 5 minutes, the gap between the rolls was adjusted to become approximately 2 mm according to the thickness of the sheet and the rolled strips were taken out. After cutting the strips in conformity to a mold which was 200 mm long, 160 mm wide and 2 mm thick, the strips were put in a press machine whose press plate was set at 130° C. in advance and then was pressed by 5 MPa pressure for five minutes to be cooled to the temperature less than 30° C. without any change, thus making a sheet which was 200 mm long, 160 mm wide and 2 mm thick. The sheet thus obtained was immersed in warm water of 80° C. for 24 hours, thus obtaining crosslinked bodies according to the examples 18 to 25.

Example 26

Except for changing, in the graft process, the softener into the aliphatic cyclic saturated hydrocarbon resin, and a feeding method into one where the compounded amount of the aliphatic cyclic saturated hydrocarbon resin as listed in the Table 3 underwent a dry blend with the ethylene-propylene copolymer from a hopper section to be injected so that the rate of the compounded amount of the aliphatic cyclic saturated hydrocarbon resin was kept constant, the crosslinked bodies were made by the same method as those in the examples 18 to 25.

Comparative Examples 1 and 2

Except for changing the compounded amounts of the vinyltrimethoxysilane and the peroxy-cyclohexane acid 1,1-t-butyl into those as listed in a Table 2, the crosslinked bodies were made by the same method as that in the example 3.

Comparative Example 3

Except for changing the organic peroxide into di-t-butyl peroxide (one-minute half-life temperature was 185.9° C.) and the compounded amount of the organic peroxide into that as listed in the Table 2, the crosslinked body was made by the same method as that in the example 1.

Comparative Example 4

Except for changing a type of the base resin into one whose propylene component was 96% by mass, the crosslinked body was made by the same method as that in the example 1.

Method for Measuring Various Parameters Listed in Table

The component amount of the polypropylene of the base resin, the melt mass flow rate (MFR), the type of silane coupling agent, the amount of silane coupling agent, the one-minute half-life temperature of the organic peroxide, and the amount of the organic peroxide are listed in the Tables.

(1) Amount of Propylene Component

A composition of the ethylene-propylene copolymer is determined as a mass percent of the propylene by measuring a mass percent of the ethylene according to ASTM D3900 as below and then subtracting the measured value of the mass percent of the ethylene from 100. A homogeneous film of the present polymer component pressed at 150° C. or more is fitted on an infrared spectrophotometer (Nicolet MAGNA550). A perfect spectrum of the sample ranging from 600 cm-1 to 4,000 cm-1 is recorded and the mass percent of the ethylene of the copolymer component is calculated from the formula expressed by $$\text{Mass \% of the ethylene} = 82.585 - 111.987X + 30.045X2,$$

wherein in the formula, X denotes a ratio of a peak height of 1155 cm$^{-1}$ to a higher peak height in the peak heights of 722 cm$^{-1}$ and 732 cm$^{-1}$.

(2) MFR

The MFR is a value measured by a method pursuant to the condition, that test temperature is 230° C. and a test load is 2.1 6 kg, based on "MFR of Plastic-Thermoplastic Plastic and Melt Volume Flow Rate I (MVR)" according to JIS K 7210.

(3) "Method for Measuring One-Minute Half-Life Temperature of Organic Peroxide"

The method of the one-minute half-life temperature of the organic peroxide is as described above.

Method for Evaluating Various Measured Results Listed in Table

The evaluation was conducted for the following items of the crosslinked sheets thus obtained.

(1) Heat Deformation Ratio of Crosslinked Sheet

The heat deformation ratio of the crosslinked body is measured by a method pursuant to a method h for measuring a heat deformation ratio in "Method for Testing Rubber or Plastic-Insulated Cable" according to JIS C 3005. Specifically, the sheet-like test piece of the crosslinked body (2 mm thick, about 15 mm wide, and about 30 mm long) is put in a test machine heated to 100° C. in advance and after heating the test piece for 30 minutes therein, the test piece is laid on a place between parallel plates of the measuring device and then a load of 2.0 kgf was applied to the test piece and further after 30 minutes at the same temperature, the thickness t1 of the test piece was measured just as it is and the heat deformation ration is calculated as a reduction ratio from the thickness t1 after heating and the thickness t0 before heating.

$$X=(t_0-t_1)/t_0*100$$

wherein X is the reduction ratio (%), $t_0$ is the thickness before heating (mm), $t_1$ is the thickness after heating (mm). The heat deformation ratio of 35% or less is permissible.

(2) Residual Strain Ratio

A residual strain ratio is determined in the following fashion. A rectangular test piece of the crosslinked body (thickness: 2 mm, width: 10 mm, and length: 50 mm except for a length of the grippers) is put into a test machine heated to 90° C. in advance. After heating the sample for 5 minutes, an initial setting (a) described below is carried out to determine a length of the crosslinked body before a tensile test. Then, after extending the crosslinked body at a tension rate of 50 mm/min. inside the test machine until the strain ratio reaches 250%, the crosslinked body is immediately recovered at a speed of 50 mm/min to measure a distance between grippers at the moment the stress becomes 0 pa. Thus, the residual strain ratio is determined according to the following formula, from this length $l_1$ h after applying tension and a length $l_0$ before applying tension.

$$Y=(l_1-l_0)/l_0*100,$$

wherein Y is the tensile residual strain ratio (%), $l_0$ is the length before applying tension (mm), and $l_1$ is the length after applying tension (mm).

Initial Setting (a)

After preheating the test piece at 90° C. for 5 minutes, the crosslinked body is held in upper and lower grippers (an interval between the both is 50 mm) of the tensile testing machine, and thereafter such an operation is performed that a distance between the upper and lower grippers at the time of removing a deflection till the stress reaches 17.5 kPa at the tension rate of 5.0 mm/min. or less is defined as the length before applying the tension.

The residual strain ratio of 60% or less is permissible and that of 40% or less is more desirable.

(3) Hardness

Using a sample of 80 mm×50 mm×6 mm, the hardness was measured with a hardness tester (JIS A) pursuant to JIS K6253. The hardness of 85 or less is permissible.

(4) Compression Set

The compression set is a value measured in conformity to JIS K6262. Specifically, a test piece which is 29.0 mm across and 12.5 mm thick is cut off and then the thickness at this time was exactly measured as the original thickness of the test piece. Next, the thickness of this test piece was compressed by 25% to be fixed and then was left at 100° C. for 70 hours. Afterward, the test piece was detached and after leaving the test piece for 30 min, the compression set was calculated by the following formula. The compression set of 60% or more is permissible.

Compression set (%)={the original thickness (mm) of the test piece−the thickness of the test piece after the test}/{the original thickness (mm) of the test piece (mm)−the thickness of a spacer (mm)}*100

(5) Resistance to Tracking

A test piece of 50 mm×120 mm×6 mm is made. The surface of the test piece is polished with an abrasive paper of #2000 until the grazing of the surface disappears. According to JIS C2136, a contaminating liquid (ammonia water) is started to be supplied (0.3 ml/min.) onto the surface of the test piece made above and with the contaminating liquid allowed to flow constantly there-onto, a voltage is boosted up to 3.5 kV to measure a time required to cause its dielectric breakdown. If the dielectric breakdown is generated within or beyond 360 minutes, a mark x or a mark ○ is recorded, respectively.

(6) AC Breakdown

A discoidal test piece 1 mm thick is made according to JIS C2110-1. Electrodes were set at an approximately central portion of the test piece between upper and lower portions of the test piece. An AC voltage is boosted from 0 V at a constant rate (1 kV/10 min.) and thus an AC breakdown voltage is measured. The AC breakdown strength is determined by the following formula. The AC dielectric breakdown strength of 25 k V/mm or more is permissible.

AC dielectric breakdown strength (kV/mm)=AC dielectric breakdown voltage (kV)/thickness of test piece (mm)

The details of each of the components in the compositions used in the examples and the comparative examples are as shown below.

Resin Component

EP elastomer (ethylene-propylene copolymer)
Propylene content=85%
MFR=20 g/10 min.

EP elastomer (ethylene-propylene copolymer)
Propylene content=84%
MFR=2.5 g/10 min.

EP elastomer (ethylene-propylene copolymer)
Propylene content=75%
MFR=5 g/10 min EP elastomer (ethylene-propylene copolymer)
  Propylene content=96%
  MFR=2.5 g/10 min
Silane Coupling Agent
Trade name: SZ-6300 made by Toray Dow Corning Co., Ltd.
Organic Peroxide
Trade name: Perhexa C made by NOF Corporation
Insulating Inorganic Filler
Calcium carbonate: Trade name: Shirotsuya-ka CC made by Shiraishi Calcium Kaisha Ltd.
Softener
Paraffinic Oil Trade name: PW-380 made by Idemitsu Petroleum Co., Ltd.
Aromatic cyclic saturated hydrocarbon resin, Trade name: Alcon P-100 made by Arakawa Chemical Industries, Ltd.
Carbon Black
Trade name: Carbon black #3H made by Tokai Carbon Co., Ltd.
Compatibilizer
Trade name: Powder Stearic Acid made by NOF Corporation,
Anti-Aging Agent
Trade Name: Nocrac MB made by Ouchi-Shinko chemical Industrial Co., Ltd.

The above results are shown in the following Tables.

TABLE 1

|  | Example 1 | Example 2 | Example 3 | Example 4 | Example 5 | Example 6 | Example 7 |
|---|---|---|---|---|---|---|---|
| Polypropylene component [% by mass] | 85 | 85 | 84 | 84 | 84 | 84 | 84 |
| MFR [g/10 min] | 20 | 20 | 2.5 | 2.5 | 2.5 | 2.5 | 2.5 |
| Type of Silane | VTMS | VTMS | VTMS | VTMS | VTMS | VTMS | VTMS |
| Silane amount [pts. Mass] | 2 | 5 | 1 | 1 | 2 | 2 | 2 |
| $T_{h1}$ of peroxide [° C.] | 153.8 | 153.8 | 153.8 | 153.8 | 153.8 | 153.8 | 153.8 |
| Peroxide amount [pts. mass] | 0.23 | 0.32 | 0.32 | 0.57 | 0.1 | 0.32 | 0.6 |
| Heat Deformation ratio [%] | 35 | 28.9 | 22.1 | 20.3 | 26.4 | 24.4 | 14.6 |
| Residual strain ratio [%] | 34.7 | 28.9 | 28.7 | 28.7 | 39.5 | 30.5 | 21.4 |

|  | Example 8 | Example 9 | Example 10 | Example 11 | Example 12 | Example 13 |
|---|---|---|---|---|---|---|
| Polypropylene component [% by mass] | 84 | 84 | 85 | 84 | 75 | 84 |
| MFR [g/10 min] | 2.5 | 2.5 | 20 | 2.5 | 5 | 2.5 |
| Type of Silane | VTMS | VTMS | VTMS | VTES | VTMS | VTMS |
| Silane amount [pts. mass] | 5 | 5 | 5 | 5 | 2 | 2 |
| $T_{h1}$ of peroxide [° C.] | 153.8 | 153.8 | 130.0 | 153.8 | 153.8 | 175.2 |
| Peroxide amount [pts. mass] | 0.12 | 0.32 | 0.36 | 0.32 | 0.32 | 0.27 |
| Heat Deformation ratio [%] | 25.3 | 16.6 | 29 | 25.8 | 26.9 | 22.3 |
| Residual strain ratio [%] | 37.3 | 28.4 | 35.6 | 33.8 | 21.6 | 29.8 |

TABLE 2

|  | Comparative example 1 | Comparative example 2 | Comparative example 3 | Comparative example 4 |
|---|---|---|---|---|
| Polypropylene component [% by mass] | 84 | 84 | 85 | 96 |
| MFR [g/10 min] | 2.5 | 2.5 | 20 | 2.5 |
| Type of Silane | VTMS | VTMS | VTMS | VTMS |
| Silane amount [pts. mass] | 5 | 1 | 2 | 2 |
| $T_{h1}$ of peroxide [° C.] | 153.8 | 153.8 | 185.9 | 153.8 |
| Peroxide amount [pts. mass] | 0.65 | 0.09 | 0.18 | 0.23 |
| Heat Deformation ratio [%] | 13.4 | 40.3 | 23 | 4 |
| Residual strain ratio [%] | broken | 42.8 | broken | broken |

TABLE 3

| Composition | Example 14 | Example 15 | Example 16 | Example 17 | Example 18 | Example 19 | Example 20 |
|---|---|---|---|---|---|---|---|
| Polypropylene component [% by mass] | 84 | 84 | 84 | 84 | 84 | 84 | 84 |
| MFR [g/10 min] | 2.5 | 2.5 | 2.5 | 2.5 | 2.5 | 2.5 | 2.5 |
| Type of Silane | VTMS | VTMS | VTMS | VTMS | VTMS | VTMS | VTMS |
| Silane amount [pts. Mass] | 2 | 2 | 2 | 2 | 2 | 2 | 2 |
| $T_{h1}$ of peroxide [° C.] | 153.8 | 153.8 | 153.8 | 153.8 | 153.8 | 153.8 | 153.8 |
| Peroxide amount [pts. mass] | 0.32 | 0.32 | 0.32 | 0.32 | 0.32 | 0.32 | 0.32 |
| Calcium carbonate amount [pts. mass] | 10 | 50 | 100 | 150 | 10 | 50 | 100 |
| Softener [pts. mass per 100 pts of Calcium carbonate]  Process oil | 0 | 0 | 0 | 0 | 5 | 5 | 5 |
| Aromatic Cyclic saturated hydrocarbon resin | 0 | 0 | 0 | 0 | 0 | 0 | 0 |
| Carbon black [pts. mass] | 1 | 1 | 1 | 1 | 1 | 1 | 1 |
| Compatibilizer [pts. mass] | 2 | 2 | 2 | 2 | 2 | 2 | 2 |
| Anti-aging agent [pts. mass] | 1.3 | 1.3 | 1.3 | 1.3 | 1.3 | 1.3 | 1.3 |
| Heat distortion ratio [%] | 20.5 | 17.3 | 14.4 | 11.7 | 22.3 | 18.9 | 15.4 |
| Residual strain ratio [%] | 30.2 | 39.1 | 43.1 | 47.5 | 34.3 | 39.5 | 4.26 |
| Hardness | 64.6 | 70.3 | 72.5 | 81.6 | 62.1 | 63.5 | 75 |
| Compression set [%] | 28.1 | 29.4 | 30.5 | 41.4 | 29.3 | 31.3 | 44.7 |
| Resistance to tracking | ◯ | ◯ | ◯ | ◯ | ◯ | ◯ | ◯ |
| AC dielectric breakdown strength [kV/mm] | 25.3 | 27.6 | 30.2 | 45 | 27.4 | 29.1 | 32.2 |

| Composition | Example 21 | Example 22 | Example 23 | Example 24 | Example 25 | Example 26 |
|---|---|---|---|---|---|---|
| Polypropylene component [% by mass] | 84 | 84 | 84 | 84 | 84 | 84 |
| MFR [g/10 min] | 2.5 | 2.5 | 2.5 | 2.5 | 2.5 | 2.5 |
| Type of Silane | VTMS | VTMS | VTMS | VTMS | VTMS | VTMS |
| Silane amount [pts. Mass] | 2 | 2 | 2 | 2 | 2 | 2 |
| $T_{h1}$ of peroxide [° C.] | 153.8 | 153.8 | 153.8 | 153.8 | 153.8 | 153.8 |
| Peroxide amount [pts. mass] | 0.32 | 0.32 | 0.32 | 0.32 | 0.32 | 0.32 |
| Calcium carbonate amount [pts. mass] | 100 | 100 | 100 | 150 | 150 | 100 |
| Softener [pts. mass per 100 pts of Calcium carbonate]  Process Oil | 10 | 30 | 50 | 10 | 50 | 0 |
| Aromatic Cyclic saturated hydrocarbon resin | 0 | 0 | 0 | 0 | 0 | 30 |
| Carbon black [pts. mass] | 1 | 1 | 1 | 1 | 1 | 1 |
| Compatibilizer [pts. mass] | 2 | 2 | 2 | 2 | 2 | 2 |
| Anti-aging agent [pts. mass] | 1.3 | 1.3 | 1.3 | 1.3 | 1.3 | 1.3 |
| Heat distortion ratio [%] | 17.8 | 22.1 | 25.4 | 12.3 | 19.8 | 13.1 |
| Residual strain ratio [%] | 45.3 | 46.1 | 47.9 | 49.3 | 53.3 | 42.6 |
| Hardness | 72.5 | 62.5 | 52.5 | 79.6 | 59.6 | 63.8 |
| Compression set [%] | 46.3 | 49.7 | 52.3 | 51.3 | 57 | 31.3 |
| Resistance to tracking | ◯ | ◯ | ◯ | ◯ | ◯ | ◯ |
| AC dielectric breakdown strength [kV/mm] | 34.7 | 37.3 | 42.8 | 46.2 | 49.7 | 36.9 |

In the example 1 and the example 12, the base resins considerably different in the propylene contents were used. In both the examples, the propylene component amount of the propylene copolymer resin, MFR, the compounded amounts of the organic peroxide and the silane coupling agent in regard to the propylene copolymer resin, and the one-minute half-life temperature of the organic peroxide fall within the predetermined range and therefore both the examples satisfy a target performance with respect to each of the evaluation items after the crosslinking reaction.

In the example 1 and the example 6, the base resins different considerably in MFR were used. Since the value of MFR lies between 2.5 and 20.0 g/10 min., both the examples satisfy a target performance in regard to each of the evaluation items after the crosslinking reaction.

In the example 2, the example 10 and the example 13, the organic peroxides different considerably in the one-minute half-life temperature were used. Since the one-minute half-life temperatures of the organic peroxides lie between 130 and 176° C., these examples satisfy a target performance in regard to each of the evaluation items after the crosslinking reaction.

In the example 9 and the example 11, the silane coupling agents different in type were used. Even in using any type of the silane coupling agents, both the examples satisfy a target performance in regard to each of the evaluation items after the crosslinking reaction.

In the example 5 and the example 7, the amounts of the organic peroxide are different considerably from each other. In both the examples, since the compounded amounts of the organic peroxide are in the range of 0.1 to 0.6 pts. mass based on 100 pts. mass of the ethylene-propylene copolymer resin, both the examples satisfy a target performance in regard to each of the evaluation items after the crosslinking reaction.

In the example 2 and the example 3, the amounts of the silane coupling agent are different considerably from each other. In both the examples, since the amount of the silane coupling agent is in the range of 1 to 5 pts. mass based on 100 pts. mass of the ethylene-propylene copolymer resin, both the examples satisfy a target performance in regard to each of the evaluation items after the crosslinking reaction.

In examples 14 to 25, the compounded amounts of the insulating inorganic filler or the process oil are different from each other. Since the calcium carbonate is 10 to 150 pts. mass based on 100 pts. mass of the silane-crosslinkable ethylene-propylene copolymer and further the process oil is in the rage of 5 to 50 pts. mass based on 100 pts. mass of the calcium carbonate, these examples satisfy a target performance in regard to each of the evaluation items after the crosslinking reaction.

In the example 26, the aliphatic cyclic saturated hydrocarbon resin was used in substitution for the process oil. Even in using the same compounded amount as those described in the examples 18 to 25, the example satisfies a target performance in regard to each of the evaluation items after the crosslinking reaction.

In the comparative example 1, since the organic peroxide was excessive in amount, the base resin made excessive progress in decomposition to become unendurable for the deformation of 250% at the time of measuring the residual strain ratio and hence was broken.

In the comparative example 2, since the organic peroxide is too low in amount, the crosslinking reaction was not fully progressed, and then the heat deformation ratio after the crosslinking reaction exceeded 40%.

In the comparative example 3, since the one-minute half-life temperature of the organic peroxide was too high, the resin made excessive progress in decomposition at the time of extruding to become unendurable for the deformation of 250% at the time of measuring the residual strain ratio and hence was broken.

In the comparative example 4, the component of the propylene of the ethylene-propylene copolymer was excessive in amount, the rubber-like property was poor in the resin itself, and hence at the time of measuring the residual strain ratio, not only the recovery motion did not occur after applying tension but the resin was broken in mid-course of the measurement.

As above, the preferred embodiments of the present disclosure have been described. The present disclosure is not limited to the above embodiments according to the present disclosure. Those skilled in the art obviously can make various altered embodiments and various modifications within the scope of the technical idea disclosed in this application. Hence, these various altered embodiments and various modifications can be definitely considered to fall within the technical scope of the present disclosure.

What is claimed is:

1. A crosslinked body for connecting electric cables, comprising:
a cross-linked silane-crosslinkable ethylene-propylene graft copolymer containing an insulating inorganic filler, the cross-linked silane-crosslinkable ethylene-propylene graft copolymer being obtained by crosslinking a silane-crosslinkable ethylene-propylene graft copolymer having the insulating inorganic filler incorporated therein during a graft modification,
wherein the silane-crosslinkable ethylene-propylene graft copolymer having the insulating inorganic filler incorporated therein during the graft modification is obtained by compounding an organic peroxide (B), a silane coupling agent selected from vinyl trimethoxysilane and/or vinyl triethoxysilane (C), and the insulating inorganic filler (D) with an ethylene-propylene random copolymer resin (A), wherein the ethylene-propylene random copolymer resin has an isotactic structure, an ethylene component and a propylene component being 5 to 25% by mass and 75 to 95% by mass, respectively, and a melt mass flow rate measured at 230° C. and with a load of 2.16 kg applied is 20.0 g/10 min or less, wherein the organic peroxide (B) is present in an amount of 0.1 to 0.6 pts. mass based on 100 pts. mass of the ethylene-propylene copolymer resin (A) and a one-minute half-life temperature of the organic peroxide (B) is between 150° C. and 166° C.,
wherein the crosslinked body has a heat deformation ratio of 35% or less which indicates a reduction rate X % determined by a formula $X=(t_0-t_1)/t_0*100$, where $t_0$ denotes thickness of a test piece before heating and $t_1$ denotes thickness thereof after heating, the thickness $t_1$ being determined in such a manner that the test piece is made into a rectangular shape that is 2 mm thick, 15 mm wide, and 30 mm long, and after heating the test piece at 100° C. for 30 min., a load of 2.0 kg is applied to the test piece, followed by further heating the test piece at the same temperature for 30 min. and thereafter the thickness $t_1$ is measured, so that the thickness $t_1$ is obtained, and
an AC dielectric breakdown strength of the crosslinked body is 25 kV/mm or more which is determined by a formula AC dielectric breakdown strength (kV/mm)= AC dielectric breakdown voltage (kV)/thickness of test piece (mm), obtained by the following procedure: according to JIS C2110-1 electrodes are set at an approximately central portion of a test piece of 1 mm thick between upper and lower portions of the test piece, an AC voltage is boosted from 0V at a constant rate (1 kV/10 min.) and an AC breakdown voltage is measured.

2. A crosslinked body for connecting electric cables, comprising:
a cross-linked silane-crosslinkable ethylene-propylene graft copolymer containing an insulating inorganic filler, the cross-linked silane-crosslinkable ethylene-propylene graft copolymer being obtained by crosslinking a silane-crosslinkable ethylene-propylene graft copolymer having the insulating inorganic filler incorporated therein during a graft modification,
wherein the silane-crosslinkable ethylene-propylene graft copolymer having the insulating inorganic filler incorporated therein during the graft modification is obtained by compounding an organic peroxide (B), a silane coupling agent selected from vinyl trimethoxysilane and/or vinyl triethoxysilane (C), and the insulating inorganic filler (D) with an ethylene-propylene random copolymer resin (A), wherein the ethylene-propylene random copolymer resin has an isotactic structure, an ethylene component and a propylene component being 5 to 25% by mass and 75 to 95% by mass, respectively, and a melt mass flow rate measured at 230° C. and with a load of 2.16 kg applied is 20.0 g/10 min or less, wherein the organic peroxide (B) is present in an amount of 0.1 to 0.6 pts. mass based on 100 pts. mass of the ethylene-propylene copolymer resin (A) and a one-minute half-life temperature of the organic peroxide (B) is between 150° C. and 166° C., wherein the crosslinked body has a residual strain ratio of 60% or less which is determined by a formula $(l_1-l_0)/l_0*100$, where $l_1$ denotes a length of a test piece after applying tension thereto and $l_0$ denotes a length thereof before applying tension thereto, the length $l_1$ being determined in such a manner that the test piece is made into a rectangular shape that is 2 mm thick, 10 mm wide, and 50 mm long except for a length of grippers, and after putting the test piece into a test machine heated at 90° C. to heat the test piece for 5 minutes therein, the test piece is extended at a tension rate of 50 mm/min. till its strain ratio reaches 250% and immediately after that, the test piece thus extended is turned back to normal at the rate of 50 mm/min. and at the moment a stress caused by the extending action becomes zero, a distance of the test piece between grippers is measured, so that the length $l_1$ is obtained from the distance, an AC dielectric breakdown strength of the crosslinked body is 25 kV/mm or more which is determined by a formula AC dielectric breakdown strength (kV/mm)=AC dielectric breakdown voltage (kV)/thickness of test piece (mm), obtained by the following procedure: according to JIS C2110-1 electrodes are set at an approximately central portion of a test piece of 1 mm thick between upper and lower portions of the test piece, an AC voltage is boosted from 0V at a constant rate (1 kV/10 min.) and an AC breakdown voltage is measured.

3. The crosslinked body according to claim 1, wherein a compounded amount of the silane coupling agent (C) is 1 to 5 pts. mass based on 100 pts. mass of the ethylene-propylene copolymer resin (A).

4. The crosslinked body of claim 1, further comprising a softener.

5. The crosslinked body according to claim 1, wherein a compounded amount of the insulating inorganic filler is 10 to 150 pts. mass based on 100 pts. mass of the silane-crosslinkable ethylene-propylene graft copolymer.

6. The crosslinked body according to claim 4, wherein a compounded amount of the softener is 5 to 50 pts. mass based on 100 pts. mass of the insulating inorganic filler.

7. The crosslinked body according to claim 2, wherein a compounded amount of the silane coupling agent (C) is 1 to 5 pts. mass based on 100 pts. mass of the ethylene-propylene copolymer resin (A).

8. The crosslinked body of claim 2, further comprising a softener.

9. The crosslinked body according to claim 8, wherein a compounded amount of the softener is 5 to 50 pts. mass based on 100 pts. mass of the insulating inorganic filler.

10. The crosslinked body according to claim 2, wherein a compounded amount of the insulating inorganic filler is 10 to 150 pts. mass based on 100 pts. mass of the silane-crosslinkable ethylene-propylene graft copolymer.

11. The crosslinked body of claim 1, wherein a dielectric breakdown is generated beyond 360 minutes obtained by the following procedure: according to JIS C2136, a contaminating liquid (ammonia water) is started to be supplied (0.3 ml/min.) onto the surface of a test piece of 50 mm*120 mm*6 mm and with the contaminating liquid allowed to flow constantly thereonto, a voltage is boosted up to 3.5 kV to measure a time required to cause its dielectric breakdown.

12. The crosslinked body according to claim 11, wherein a compounded amount of the insulating inorganic filler is in the range of 50 to 100 pts. mass, based on 100 pts. mass of the ethylene-propylene copolymer resin (A).

13. The crosslinked body according to claim 12, wherein the AC dielectric breakdown strength is 27.6 kV/mm or more which is determined by a formula AC dielectric breakdown strength (kV/mm)=AC dielectric breakdown voltage (kV)/thickness of test piece (mm), obtained by the following procedure: according to JIS C2110-1 electrodes are set at an approximately central portion of a test piece of 1 mm thick between upper and lower portions of the test piece, an AC voltage is boosted from 0V at a constant rate (1 kV/10 min.) and an AC breakdown voltage is measured.

14. The crosslinked body of claim 2, wherein a dielectric breakdown is generated beyond 360 minutes obtained by the following procedure: according to JIS C2136, a contaminating liquid (ammonia water) is started to be supplied (0.3 ml/min.) onto the surface of a test piece of 50 mm*120 mm*6 mm and with the contaminating liquid allowed to flow constantly thereonto, a voltage is boosted up to 3.5 kV to measure a time required to cause its dielectric breakdown.

15. The crosslinked body according to claim 14, wherein a compounded amount of the insulating inorganic filler is in the range of 50 to 100 to pts. mass, based on 100 pts. mass of the ethylene-propylene copolymer resin (A).

16. The crosslinked body according to claim 15, wherein the AC dielectric breakdown strength is 27.6 kV/mm or more which is determined by a formula AC dielectric breakdown strength (kV/mm)=AC dielectric breakdown voltage (kV)/thickness of test piece (mm), obtained by the following procedure: according to JIS C2110-1 electrodes are set at an approximately central portion of a test piece of 1 mm thick between upper and lower portions of the test piece, an AC voltage is boosted from 0V at a constant rate (1 kV/10 min.) and an AC breakdown voltage is measured.

17. The crosslinked body according to claim 1, wherein a compounded amount of insulating inorganic filler is in a range of 100 to 150 pts mass based on 100 pts mass of the ethylene-propylene copolymer resin(A).

18. The crosslinked body according to claim 2, wherein a compounded amount of insulating inorganic filler is in a range of 100 to 150 pts mass based on 100 pts mass of the ethylene-propylene copolymer resin(A).

19. The crosslinked body according to claim 17, wherein the AC dielectric breakdown strength of the crosslinked body is 30.2 kV/mm or more which is determined by a formula AC dielectric breakdown strength (kV/mm)=AC dielectric breakdown voltage (kV)/thickness of test piece (mm), obtained by the following procedure: according to JIS C2110-1 electrodes are set at an approximately central portion of a test piece of 1 mm thick between upper and lower portions of the test piece, an AC voltage is boosted from 0V at a constant rate (1 kV/10 min.) and an AC breakdown voltage is measured.

20. The crosslinked body according to claim 18, wherein the AC dielectric breakdown strength of the crosslinked body is 30.2 kV/mm or more which is determined by a formula AC dielectric breakdown strength (kV/mm)=AC dielectric breakdown voltage (kV)/thickness of test piece (mm), obtained by the following procedure: according to JIS C2110-1 electrodes are set at an approximately central portion of a test piece of 1 mm thick between upper and lower portions of the test piece, an AC voltage is boosted from 0V at a constant rate (1 kV/10 min.) and an AC breakdown voltage is measured.

* * * * *